(12) United States Patent
Yeo et al.

(10) Patent No.: US 8,901,691 B2
(45) Date of Patent: Dec. 2, 2014

(54) TOUCH SENSING SUBSTRATE AND METHOD OF MANUFACTURING THE SAME

(75) Inventors: Yun-Jong Yeo, Seoul (KR);
Byeong-Hoon Cho, Seoul (KR);
Ki-Hun Jeong, Cheonan-si (KR);
Hong-Kee Chin, Suwon-si (KR);
Jung-Suk Bang, Guri-si (KR);
Woong-Kwon Kim, Cheonan-si (KR);
Sung-Ryul Kim, Asan-si (KR);
Hee-Joon Kim, Asan-si (KR);
Dae-Cheol Kim, Hwaseong-si (KR);
Kun-Wook Han, Seongnam-si (KR)

(73) Assignee: Samsung Display Co., Ltd., Yongin (KR)

( * ) Notice: Subject to any disclaimer, the term of this patent is extended or adjusted under 35 U.S.C. 154(b) by 313 days.

(21) Appl. No.: 13/243,737

(22) Filed: Sep. 23, 2011

(65) Prior Publication Data
US 2012/0188204 A1 Jul. 26, 2012

(30) Foreign Application Priority Data
Jan. 21, 2011 (KR) .................. 10-2011-0006360

(51) Int. Cl.
*H01L 27/32* (2006.01)
*G06F 3/042* (2006.01)
*G06F 3/041* (2006.01)

(52) U.S. Cl.
CPC .............. *G06F 3/0412* (2013.01); *G06F 3/042* (2013.01)
USPC ........ 257/431; 257/E21.411; 257/55; 257/53; 257/290; 257/E29.273; 257/233; 257/E51.012; 257/E51.026; 257/E31.054; 257/E31.093; 345/175; 438/157; 438/29

(58) Field of Classification Search
CPC ................... H01L 21/02365; H01L 27/3227; H01L 27/323; H01L 31/12; H01L 27/1214; G06F 3/0412; G06F 3/0421; G06F 2203/04103; G06F 3/042
USPC ............ 345/175; 438/157, 29; 257/E21.411, 257/55, 53, 66, 290, E29.273, E33.06, 60, 257/E31.049, 98, 294, E31.121, 233, 257/E51.012, E51.026, E33.077, E31.001, 257/E31.054, E31.093, E31.096, E31.101
See application file for complete search history.

(56) References Cited

U.S. PATENT DOCUMENTS 8,598,587 B2 * 12/2013 Yeo et al. .................. 257/60
2004/0105067 A1 * 6/2004 Kim et al. ................ 349/187

(Continued)

FOREIGN PATENT DOCUMENTS

| JP | 11-097705 | 4/1999 |
|---|---|---|
| JP | 2001-036097 | 2/2001 |
| JP | 2003-023014 | 1/2003 |

*Primary Examiner* — Jarrett Stark
*Assistant Examiner* — Bitew Dinke
(74) *Attorney, Agent, or Firm* — H.C. Park & Associates, PLC

(57) ABSTRACT

A touch sensing substrate includes a substrate, a first light sensing element, a second light sensing element and a first bias line. The first light sensing element includes a first gate electrode, a first active pattern overlapping with the first gate electrode, a first source electrode partially overlapping with the first active pattern and a first drain electrode partially overlapping with the first active pattern. The second light sensing element includes a second gate electrode, a second active pattern overlapping with the second gate electrode, a second source electrode partially overlapping with the second active pattern and a second drain electrode partially overlapping with the second active pattern. The first bias line is connected to the first and second gate electrodes.

9 Claims, 12 Drawing Sheets

(56) References Cited

U.S. PATENT DOCUMENTS

| | | | |
|---|---|---|---|
| 2005/0078246 A1* | 4/2005 | Yoo et al. | 349/122 |
| 2005/0186718 A1* | 8/2005 | Yoo et al. | 438/151 |
| 2006/0250537 A1* | 11/2006 | Lee | 349/43 |
| 2007/0138471 A1* | 6/2007 | Lim et al. | 257/59 |
| 2008/0067528 A1* | 3/2008 | Choi et al. | 257/89 |
| 2008/0217624 A1* | 9/2008 | Kwak et al. | 257/71 |
| 2009/0047761 A1* | 2/2009 | Yamazaki et al. | 438/158 |
| 2009/0146150 A1* | 6/2009 | Hosoya | 257/59 |
| 2011/0012115 A1* | 1/2011 | Jeon et al. | 257/59 |
| 2011/0018815 A1* | 1/2011 | Han et al. | 345/173 |
| 2011/0037729 A1* | 2/2011 | Cho et al. | 345/175 |
| 2011/0059562 A1* | 3/2011 | Yamazaki et al. | 438/34 |
| 2011/0068340 A1* | 3/2011 | Lee et al. | 257/59 |
| 2011/0090420 A1* | 4/2011 | Kim et al. | 349/59 |
| 2011/0090437 A1* | 4/2011 | Yoon et al. | 349/106 |
| 2011/0109609 A1* | 5/2011 | Jeong et al. | 345/211 |
| 2011/0147746 A1* | 6/2011 | Kim et al. | 257/59 |
| 2011/0181544 A1* | 7/2011 | Lee | 345/174 |
| 2011/0221723 A1* | 9/2011 | Kurokawa et al. | 345/207 |
| 2011/0254808 A1* | 10/2011 | Lin et al. | 345/175 |
| 2012/0032169 A1* | 2/2012 | Han et al. | 257/53 |
| 2012/0044444 A1* | 2/2012 | Park et al. | 349/106 |
| 2012/0126236 A1* | 5/2012 | Juhmonji | 257/59 |
| 2012/0154335 A1* | 6/2012 | Chan | 345/175 |
| 2012/0327032 A1* | 12/2012 | Jeon et al. | 345/175 |
| 2013/0033455 A1* | 2/2013 | Jeong et al. | 345/175 |
| 2013/0149813 A1* | 6/2013 | Yamazaki et al. | 438/104 |

* cited by examiner

TOUCH SENSING SUBSTRATE AND METHOD OF MANUFACTURING THE SAME

CROSS-REFERENCE TO RELATED APPLICATION

This application claims priority from and the benefit of Korean Patent Application No. 2011-6360, filed on Jan. 21, 2011, which is hereby incorporated by reference for all purposes as if fully set forth herein.

BACKGROUND OF THE INVENTION

1. Field

Example embodiments of the present invention relate to a touch sensing substrate and a method of manufacturing the touch sensing substrate. More particularly, example embodiments of the present invention relate to a touch sensing substrate capable of improving process reliability and a method of manufacturing the touch sensing substrate.

2. discussion of the Background

In the field of liquid crystal display (LCD) panels, a touch display panel having an input function in addition to displaying an image has been developed with the touch display panel including a sensing element to sense a touch position. Specifically, the touch display panel may include a first substrate on which pixel electrode(s) display the image and a switching element connected to the pixel electrode are formed, a second substrate on which a sensing element detecting light and a driving element controlling the sensing element are formed, and a liquid crystal layer disposed between the display substrate and the touch sensing substrate.

If an external touch is applied on the touch display panel, a light becomes incident to the sensing element and a photo current is generated in the sensing element by the incident light. A detecting circuit electrically connected to the touch display panel detects a touch position using a difference between the photo current and a dark current of the sensing element, the dark current being determined before the incident light is absorbed.

The touch sensing substrate may include a first light sensing element to sense a first light and a second light element to sense a second light. Since the first and second light sensing elements sense lights different from each other, the first and second light sensing elements have active patterns including semiconductor materials different from each other so as to decrease a sensing noise. Thus, the first light sensing element is formed, and then the second light sensing element is formed on the touch sensing substrate on which the first light sensing element is formed.

In a method of manufacturing the light sensing element, the semiconductor material is patterned using a first photolithography process to form an active pattern on a base substrate. A source electrode and a drain electrode are formed on the base substrate on which the active pattern formed, using a second photolithography process. The active pattern has a non-uniform side profile due to the first photolithography process, which may cause defects. For example, defects of the non-uniform side profile may include a tip which remains from the un-etched insulating layer covering the active pattern, a stringer due to an un-covered active pattern by an etch stopping layer, etc. Another defect may be that because the source and drain electrodes are formed after forming the active pattern, the source and drain electrodes may be a short circuit due to the non-uniform side profile of the active pattern.

SUMMARY OF THE INVENTION

Exemplary embodiments of the present invention provide a touch sensing substrate capable of improving process reliability of source and drain electrodes.

Exemplary embodiments of the present invention also provide a method of manufacturing the above touch sensing substrate.

Additional features of the invention will be set forth in the description which follows, and in part will be apparent from the description, or may be learned by practice of the invention.

An exemplary embodiment of the present invention discloses a touch sensing substrate includes, a substrate first light sensing element on the substrate and configured to sense a first light, the first light sensing element comprises a first gate electrode, a first active pattern overlapping with the first gate electrode, a first source electrode partially overlapping with the first active pattern, and a first drain electrode partially overlapping with the first active pattern, the first gate electrode, the first active pattern, the first source electrode and the first drain electrode being disposed on the base substrate; a second light sensing element on the base substrate and configured to sense a second light, the second light sensing element comprises a second gate electrode, a second active pattern overlapping with the second gate electrode and comprising a material different from the first active pattern, a second source electrode partially overlapping with the second active pattern, and a second drain electrode partially overlapping with the second active pattern, the second gate electrode, the second active pattern, the second source electrode and the second drain electrode being disposed on the base substrate; a first bias line connected to the first gate electrode and the second gate electrode.

In an example method of manufacturing a touch sensing substrate according to the present invention, a band pass filter, a gate line and a first gate electrode connected to the gate line are formed on a substrate. A first insulating layer, a first semiconductor layer, a first ohmic contact layer, a first metal layer and a second metal layer are formed on the substrate on which the first gate electrode is formed. The first semiconductor layer, the first ohmic contact layer, the first metal layer and the second metal layer are patterned using a first photo resist pattern having a first photo pattern of a first thickness and a second photo pattern of a second thickness to form a first active pattern overlapping with the first gate electrode pattern, a first electrode pattern overlapping with the first active pattern, a second active pattern and a second electrode pattern overlapping with a second active pattern. The second metal layer of the first and second electrode patterns is patterned using a third photo pattern which is formed by partially etching the first photo resist pattern. The first metal layer is patterned using the patterned second metal layer to form a first source electrode a first drain electrode, a second source electrode and a second drain electrode. A top gate electrode overlapping with the first active pattern, a second gate electrode overlapping with the second active pattern, a first source connection electrode connected to an upper side of the first source electrode, a second source connection electrode connected to an upper side of the second source electrode, a first drain connection electrode connected to an upper side of the first drain electrode, a second drain connection electrode connected to upper side of the second drain electrode, and a read out line and a bias line crossing the gate line are formed.

According to the present invention, the source and drain electrodes are connected to the source and drain connection electrodes through the contact hole, so that the source and drain electrodes may be prevented from forming a short circuit. In addition, the source and drain electrodes are patterned using two metal layers having etching selectivity different from each other, so that a manufacturing process may be simplified.

It is to be understood that both the foregoing general description and the following detailed description are exemplary and explanatory and are intended to provide further explanation of the invention as claimed.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE ILLUSTRATED EMBODIMENTS

Hereinafter, the present invention will be explained in detail with reference to the accompanying drawings.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 1:
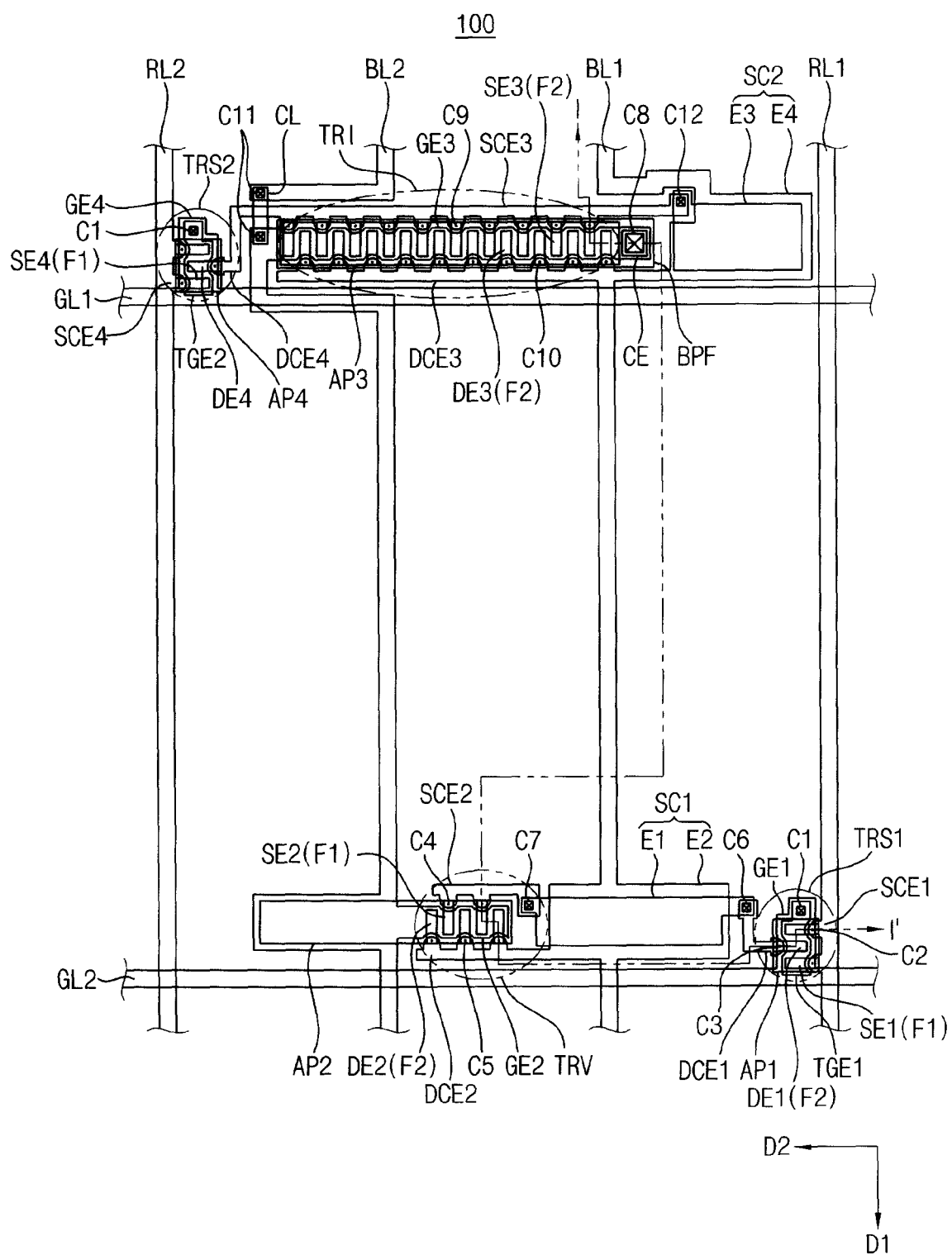
FIG. 1 is a plan view illustrating a touch sensing substrate according to an exemplary embodiment of the present invention.
Figure 2:
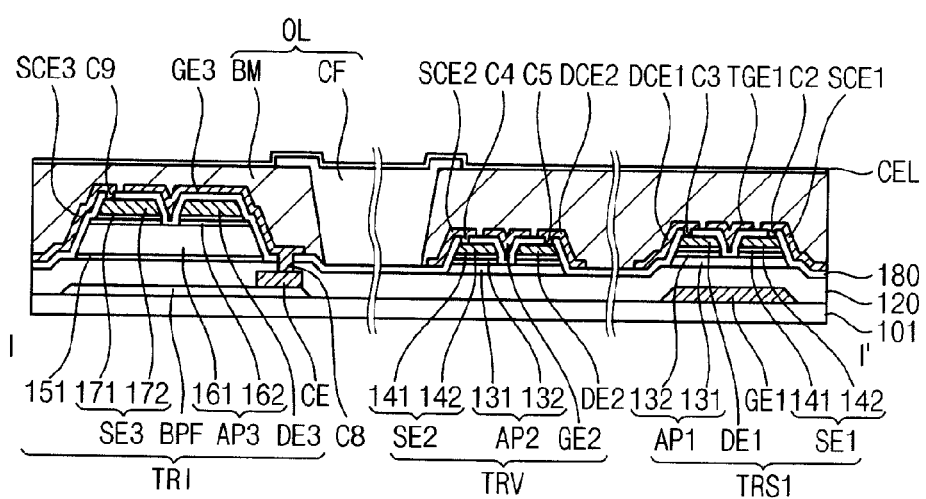
FIG. 2 is a cross-sectional view taken along a line I-I' of FIG. 1.

FIG. 1 is a plan view illustrating a touch sensing substrate according to an exemplary embodiment of the present invention. FIG. 2 is a cross-sectional view taken along a line I-I' of FIG. 1.

Referring to FIGS. 1 and 2, the touch sensing substrate 100 includes a base substrate 101, a plurality of read out lines RL1 and RL2, a plurality of bias lines BL1 and BL2, a plurality of gate lines GL1 and GL2, a first switching element TRS1, a first light sensing element TRV, a first sensing capacitor SC1, a second switching element TRS2, a second light sensing element TRI and a second sensing capacitor SC2. The touch sensing substrate 100 further includes a first insulating layer 120, an insulating pattern 151, a third insulating layer 180 and an organic insulating layer OL.

The read out lines RL1 and RL2 extend in a first direction D1 on the base substrate 101 and are arranged in a second direction D2 crossing the first direction D1.

The bias lines BL1 and BL2 extend in the first direction D1 on the base substrate 101 and are arranged in the second direction D2. The bias lines BL1 and BL2 may be disposed between the read out lines RL1 and RL2. The bias lines BL1 and BL2 may also extend for certain portions in the D2 direction.

The gate lines GL1 and GL2 extend in the second direction D2 on the base substrate 101 and are arranged in the first direction D1

The first switching element TRS1 may include a first gate electrode GE1, a first active pattern AP1, a first source electrode SE1, a first drain electrode DE1, a first top gate electrode TGE1, a first source connection electrode SCE1 and a first drain connection electrode DCE1. The first switching element TRS1 may be a thin film transistor (TFT).

The first gate electrode GE1 may be connected to the second gate line GL2. The first gate electrode GE1 may be a bottom gate electrode overlapping with the first top gate electrode TGE1.

The first active pattern AP1 may include a first semiconductor layer 131 and a first ohmic contact layer 132 disposed on the first semiconductor layer 131, and the first active pattern AP1 is disposed on the first gate electrode GE1.

The first source electrode SE1 may include a first metal layer 141 and a second metal layer 142 disposed on the first metal layer 141. The second metal layer 142 has an etching selectivity different from an etching selectivity of the first metal layer 141. The first source electrode SE1 may include at least one first finger portion F1 having a bar shape. The first finger portion F1 of the first source electrode SE1 is disposed on the first active pattern AP1. A side of the first finger portion F1 is aligned with a first side of active pattern AP1. For example, the side of the first finger portion F1 may be aligned with an imaginary extending side of the first side of active pattern AP1, or may be adjacent to the imaginary extending side of the first side of active pattern AP1.

The first drain electrode DE1 may include the first and second metal layers 141 and 142, and may include at least one second finger portion F2 having the bar shape. The second finger portion F2 of first drain electrode DE1 is disposed on the first active pattern AP1 and spaced apart from the first source electrode SE1. A side of the second finger portion F2 is aligned with a second side of the first active pattern AP1 opposite to the first side of the first active pattern AP1.

The first top gate electrode TGE1 is disposed on the first source electrode SE1 and the first drain electrode DE1, and overlaps with the first gate electrode GE1. The first top gate electrode TGE1 may be electrically connected to the first gate electrode GE1 through the first contact hole C1. Thus, the first switching element TRS1 may have at least a double gate structure.

The first source connection electrode SCE1 is connected to the first source electrode SE1 through a second contact hole C2 formed on an upper side of the first source electrode SE1. The second contact hole C2 may be formed on an upper side of the first finger portion F1 included in the first source electrode SE1. The first source connection electrode SCE1 is spaced apart from a first side of the first top gate electrode TGE1 and partially overlaps with the first source electrode SE1. The first source connection electrode SCE1 is connected to the first read out line RL1 and electrically connects the first source electrode SE1 with the first read out line RL1.

The first drain connection electrode DCE1 is connected to the first drain electrode DE1 through a third contact hole C3 formed on an upper side of the first drain electrode DE1. The third contact hole C3 may be formed an upper side of the second finger portion F2 included in the first drain electrode DE1. The first drain connection electrode DCE1 is spaced apart from a second side opposite to the first side of the first top gate electrode TGE1 and partially overlaps with the first drain electrode DE1. The first drain connection electrode DCE1 is connected to the first sensing capacitor SC1 and connects the first drain electrode DE1 with the sensing capacitor SC1.

The first light sensing element TRV may include a second active pattern AP2, a second source electrode SE2, a second drain electrode DE2, a second gate electrode GE2, a second source connection electrode SCE2 and a second drain connection electrode DCE2. The first light sensing element TRV may be a TFT.

The second active pattern AP2 may include the first semiconductor layer 131 and the first ohmic contact layer 132.

The second source electrode SE2 may include the first metal layer 141 and the second metal layer 142. The second source electrode SE2 may include at least one first finger portion F1. As illustrated in FIG. 1, the second source electrode SE2 may include the first finger portion F1 including a plurality of fingers. The fingers are arranged in parallel and each of the fingers has the bar shape. The first finger portion F1 of the first source electrode SE1 is disposed on the second active pattern AP2. A side of the first finger portion F1 is aligned with the first side of the second active pattern AP2.

The second drain electrode DE2 may include the first and second metal layers 141 and 142 such as the second source electrode SE2. The second drain electrode DE2 may include at least one second finger portion F2. The second finger portion F2 of the second drain electrode DE2 is disposed on the second active pattern AP2 and is spaced apart from the first finger portion F1 of the second source electrode SE2 in the second direction D2. A side of the second finger portion F2 is aligned with a second side opposite to the first side of the second active pattern AP2. The second gate electrode GE2 is disposed on the second source electrode SE2 and the second drain electrode DE2, and overlaps with the second active pattern AP2.

The second source connection electrode SCE2 is connected to the second source electrode SE2 through a fourth contact hole C4 formed on an upper side of the second source electrode SE2. The fourth contact hole C4 may be formed on an upper side of the first finger portion F1 included in the second source electrode SE2. The second source connection electrode SCE2 is spaced apart from a first side of the second gate electrode GE2 and partially overlaps with the second source electrode SE2. The second source connection electrode SCE2 is connected to the first sensing capacitor SC1 and connects the second source electrode SE2 with the first sensing capacitor SC1.

The second drain connection electrode DCE2 is connected to the second drain electrode DE2 through a fifth contact hole C5 formed on an upper side of the second drain electrode DE2. The fifth contact hole C5 may be formed on an upper side of the second finger portion F2 included in second drain electrode DE2. The second drain connection electrode DCE2 is spaced apart from a second side opposite to the first side of the second gate electrode GE2, and partially overlaps with the second drain electrode DE2. The second drain connection electrode DEC2 is connected to the first bias line BL1 and electrically connects the second drain electrode DE2 with the first bias line BL1.

The first bias line BL1 extends in the direction of the first drain connection electrode DCE1 and the second drain connection electrode DCE2, and connected to the first drain connection electrode DCE1 and the second drain connection electrode DCE2.

The first sensing capacitor SC1 may include a first electrode E1 and a second electrode E2. The first electrode E1 is connected to the first drain connection electrode DCE1 through a sixth contact hole C6, and is connected to the second source connection electrode SCE2 through a seventh contact hole C7. The second electrode E2 is connected to the first bias line BL1 and the second drain connection electrode DCE2.

Elements of the second switching element TRS2 are substantially similar to the elements of the first switching element TRS1. The second switching element TRS2 may include a fourth gate electrode GE4, a fourth active pattern AP4, a fourth source electrode SE4, a fourth drain electrode DE4, a second top gate electrode TGE2, a fourth source connection electrode SCE4 and a fourth drain connection electrode DCE4. The fourth gate electrode GE4 is connected to the first gate line GL1, the fourth source electrode SE4 is electrically connected to the second read out line RL2 through the fourth source connection electrode SCE4, and the fourth drain electrode DE4 is electrically connected to the second light sensing element TRI through the fourth drain connection electrode DCE4.

The second light sensing element TRI may include a band pass filter BPF, a connection electrode CE, a third active pattern AP3, a third source electrode SE3, a third drain electrode DE3, a third gate electrode GE3, a third source connection electrode SCE3 and a third drain connection electrode DCE3. The second light sensing element TRI may be a TFT.

The band pass filter BPF blocks a first light and transmits a second light. For example, the first light may be a visible light and the second light may be an infrared light.

The connection electrode CE is partially disposed in an area in which the band pass filter BPF is formed and electrically connected to the band pass filter BPF.

The third active pattern AP3 includes a second semiconductor layer 161 and a second ohmic contact layer 162 disposed on the second semiconductor layer 161, and overlaps with the band pass filter BPF.

The third source electrode SE3 is disposed on the third metal layer 171 and a fourth metal layer 172 disposed on the third metal layer 171. An etching selectivity of the third metal layer 171 is different from the etching selectivity of the fourth metal layer 172. The third source electrode SE3 may include at least one first finger portion F1. The first finger portion F1 of the third source electrode SE3 is disposed on the third active pattern AP3. A side of the first finger portion F1 is aligned with a first side of the third active pattern AP3.

The third drain electrode DE3 includes the third and fourth metal layers 171 and 172, and may include at least one second finger portion F2. The second finger portion F2 of the third drain electrode DE3 is disposed on the third active pattern AP3, and is spaced apart from the third source electrode SE3. A side of the second finger portion F2 is aligned with a second side opposite to the first side of the third active pattern AP3.

The third gate electrode GE3 is disposed on the third source electrode SE3 and the third drain electrode DE3, and overlaps with the band pass filter BPF. The third gate electrode GE3 is connected to the second bias line BL2, and the third gate electrode GE 3 is connected to the connection electrode CE through the eighth contact hole C8.

The second bias line BL2 is divided into opposite sides, thereby disposing a connection portion to connect the third source connection electrode SCE3 with the fourth drain connection electrode DCE4 between the opposite sides. The divided second bias line BL2 is connected to each other through a connection line CL and an eleventh contact hole C11 formed on the connection line CL. The third source connection electrode SCE3 and the fourth drain connection electrode DCE4 connect the second light sensing element TRI with the second switching element TRS2. Thus, the third gate electrode GE3 is electrically connected to the band pass filter BPF so that the second light sensing element TRI has at least the double gate structure.

The second bias line BL2 extends from the second gate electrode GE2 of the first light sensing element TRV and the third gate electrode GE3 of the second light sensing element TRI, and the second bias line BL2 is connected to the second gate electrode GE2 and the third gate electrode GE3. The third source connection electrode SCE3 is connected to the third source electrode SE3 through a ninth contact hole C9 formed on an upper side of the third source electrode SE3. The ninth contact hole C9 may be formed on an upper side of the first finger portion F1 included in the third source electrode SE3.

The third source connection electrode SCE3 is spaced apart from a first side of the third gate electrode GE3, and partially overlaps with the third source electrode SE3. The third source connection electrode SCE3 is connected to the second sensing capacitor SC2 and the second switching element TRS2, and the third source connection electrode SCE3 connects the third source electrode SE3 with the second sensing capacitor SC2 and the second switching element TRS2.

The third drain connection electrode DCE3 is connected to the third drain electrode DE3 through a tenth contact hole C10 formed on an upper side of the third drain electrode DE3. The tenth contact hole C10 may be formed on an upper side of the second finger portion F2 included in the third drain electrode DE3. The third drain connection electrode DCE3 is spaced apart from a second side opposite to the first side of the third gate electrode GE3, and partially overlaps with the third drain electrode DE3. The third drain connection electrode DCE3 is connected to the first bias line BL1 and connects the third drain electrode DE3 with the first bias line BL1.

The second sensing capacitor SC2 may include a third electrode E3 and a fourth electrode E4. The third electrode E3 is electrically connected to the third source connection electrode SCE3 through a twelfth contact hole C12. The fourth electrode E4 is connected to the first bias line BL1 and the third drain connection electrode DCE3.

The first insulating layer 120 is disposed on the base substrate on which the first gate electrode GE1, the band pass filter BPF, the connection electrode CE and the gate lines GL1 and GL2 are formed. The third insulating layer 180 is disposed on the base substrate 101 on which the source electrodes SE1, SE2 and SE3, the drain electrodes DE1, DE2 and DE3, the first electrode E1, the third electrode E3 are formed. The insulating pattern 151 may be disposed between the first insulating layer 120 and the third active pattern AP3. Alternatively, the insulating pattern 151 may be omitted.

The organic insulating layer OL is disposed on the base substrate 101 on which the read out lines RL1 and RL2, the bias lines BL1 and BL2, the source connection electrodes SCE1, SCE2 and SCE3, the drain connection electrodes DCE1, DCE2 and DCE3, the second electrode E2 and the fourth electrode E4 are formed. The organic insulating layer OL may be formed as a thick layer, and may include an over coating layer (not shown), a blocking pattern BM and a color filter CF.

For example, the blocking pattern BM may be disposed on blocking areas of the base substrate on which the first switching element TRS1, the second switching element TRS2, the first light sensing element TRV, the second light sensing element TRI, the first sensing capacitor SC1 and the second sensing capacitor SC2 are formed.

The color filter CF may be disposed on a pixel area of the base substrate 101. The pixel area faces an area in which a pixel electrode is formed on the display substrate opposite to and combined with the touch sensing substrate 100. In the present example embodiments, the source and the drain electrodes may be changed with each other according to a voltage level applied to each of the source and drain electrodes.

Figure 3:
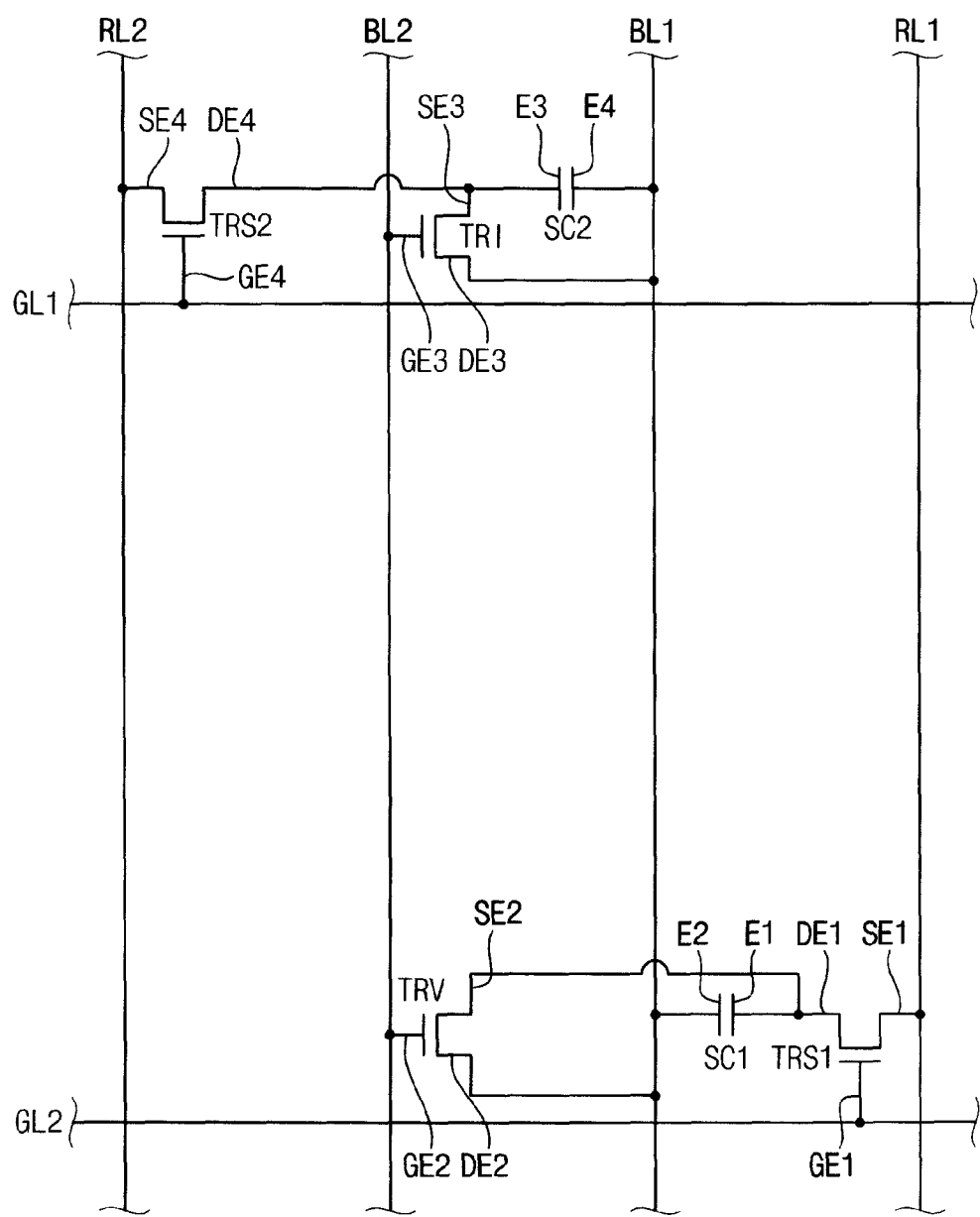
FIG. 3 is a circuit diagram illustrating the touch sensing substrate of FIG. 1.

FIG. 3 is a circuit diagram illustrating the touch sensing substrate of FIG. 1.

Referring to FIGS. 1 and 3, the touch sensing substrate 100 may include a plurality of read out lines RL1 and RL2, a plurality of bias lines BL1 and BL2, a plurality of gate lines GL1 and GL2, a first switching element TRS1, a first light sensing element TRV, a first sensing capacitor SC1, a second switching element TRS2, a second light sensing element TRI and a second sensing capacitor SC2.

A first reference voltage $Vr1$ is applied to the first read out line RL1, and a second reference voltage $Vr2$ is applied to the second read out line RL2. A first bias voltage $Vb1$ is applied to the first bias line BL1, and a second bias voltage $Vb2$ is applied to the second bias line BL2. A gate voltage $Von$ is sequentially applied to the first gate line GL1 and the second gate line GL2.

The second switching element TRS2 may include a gate electrode GE4 connected to the first gate line GL1, a source electrode SE4 connected to the second read out line RL2, and a drain electrode DE4 connected to the second sensing capacitor SC2. Here, the source and the drain electrodes may be changed with each other according to the voltage level applied to each of the source and drain electrodes.

The second light sensing element TRI may include a gate electrode GE3 connected to the second bias line BL2, a source electrode SE3 connected to a drain electrode DE4 of the second switching element TRS2 and the second sensing capacitor SC2, and a drain electrode DE3 connected to the first bias line BL1. The second sensing capacitor SC2 may include a third electrode E3 connected to a drain electrode DE2 of the second switching element TRS2 and a source electrode SE3 of the second light sensing element TRI, and a fourth electrode E4 connected to the first bias line BL1.

The first switching element TRS1 may include a gate electrode GE1 connected to the second gate line GL2, a source electrode SE1 connected to the first read out line RL1, and a drain electrode DE1 connected to the first sensing capacitor SC1. The first light sensing element TRV may include a gate electrode GE2 connected to second bias line BL2, a source electrode SE2 connected to the first switching element TRS1 and the first sensing capacitor SC1, and a drain electrode DE2 connected to the first bias line BL1. The first sensing capacitor SC1 may include a first electrode E1 connected to the drain electrode DE1 of the first switching element TRS1 and the source electrode SE2 of the first light sensing element TRV, and a second electrode E2 connected to the first bias line BL1.

A method of detecting a touch position in the touch sensing substrate 100 will be explained. A frame in which the touch sensing substrate 100 is driven may be substantially the same as a frame in which a frame image is displayed on a touch display panel, or may be different from the frame in which the frame image is displayed on the touch display panel. In an M-th frame (M is a natural number) that is a present frame, if the gate on voltage (Von) is applied to the first gate line GL1, the second switching element TRS2 is turned on so that the second reference voltage Vr2 applied to the second read out line RL2 and the first bias voltage Vb1 applied to the first bias line BL1 are applied to the third and fourth electrodes E3 and E4, respectively, of the second sensing capacitor SC2. The second sensing capacitor SC2 is charged with a voltage of a difference between the second reference voltage Vr2 and the first bias voltage Vb1.

If the gate on voltage (Von) is applied to the second gate line GL2, the first switching element TRS1 is turned on so that the first reference voltage Vr1 applied to first read out line RL1 and the first bias voltage Vb1 applied to the first bias line BL1 are applied to the first and second electrodes E1 and E2, respectively, of the first sensing capacitor SC1. The first sensing capacitor SC1 is charged with a voltage as much as a difference between the first reference voltage Vr1 and the first bias voltage Vb1. This may occur after the application of voltage to the GL1, however, the present exemplary embodiment is not limited to this order.

Then, if a gate off voltage (Voff) of a level below a predetermined threshold is applied to the first gate line GL1, the second switching element TRS2 is turned off. While the second switching element TRS2 is turned off, an infrared light generated at back of a touch display panel is reflected by an outer object touched on a surface of the touch display panel so that the reflected infrared light is provided to the second light sensing element TRI. If the second light sensing element TRI is driven by the infrared light, the second reference voltage Vr2 applied to the third electrode E3 of the second sensing capacitor SC2 drops by a photo current flowing through the second light sensing element TRI. Thus, this causes the second sensing capacitor SC2 to be discharged.

If the gate off voltage (Voff) is applied to the second gate line GL2, the first switching element TRS1 is turned off. While the first switching element TRS1 is turned off, a visible light generated at the back of the touch display panel is reflected by the outer object touched on a surface of the touch display panel so that the reflected visible light is provided to the first light sensing element TRV. If the first light sensing element TRV is driven by the visible light, the first reference voltage Vr1 applied to the first electrode E1 of the first sensing capacitor SC1 drops by a photo current flowing through the first light sensing element TRV. Thus, this causes the first sensing capacitor SC1 to be discharged.

While the first and second switching elements TRS1 and TRS2 are turned off, if the infrared light and the visible light are not provided to the first and second light sensing elements TRV and TRI by the outer object not touched on a surface of the touch display panel, the photo current does not flow. Thus, the first and second sensing capacitors SC1 and SC2 are not discharged.

In an (M+1)-th frame that is a next frame, f the gate on voltage (Von) is applied to the first gate line GL1, the second switching element TRS2 is turned on to recharge the second sensing capacitor SC2 using the second reference voltage Vr2. During the recharging the second sensing capacitor SC2, the second readout line RL2 carries a current so that a detect circuit (not shown) connected to the second read out line RL2 may detect the touch position using the current flowing through the second read out line RL2. In addition, if the gate on voltage Von is applied to the second gate line GL2, the first switching element TRS1 is turned on to recharge the first sensing capacitor SC1 using the first reference voltage Vr1. Thus, a detect circuit connected to the first read out line RL1 may detect the touch position using the current flowing through the first read out line RL1.

FIGS. 4A to FIG. 4I are cross-sectional views for explaining a method of manufacturing the touch sensing substrate according to an exemplary embodiment of the present invention. FIGS. 5A to FIG. 5D are plan views for explaining a method of manufacturing the touch sensing substrate according to an exemplary embodiment of the present invention.

Figure 4A:
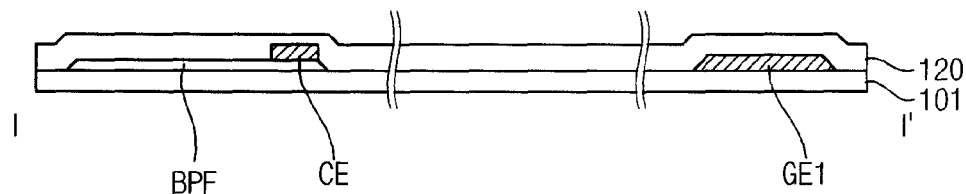
FIGS. 4A to FIG. 4I are cross-sectional views for explaining a method of manufacturing the touch sensing substrate according to an exemplary embodiment of the present invention.
Figure 5A:
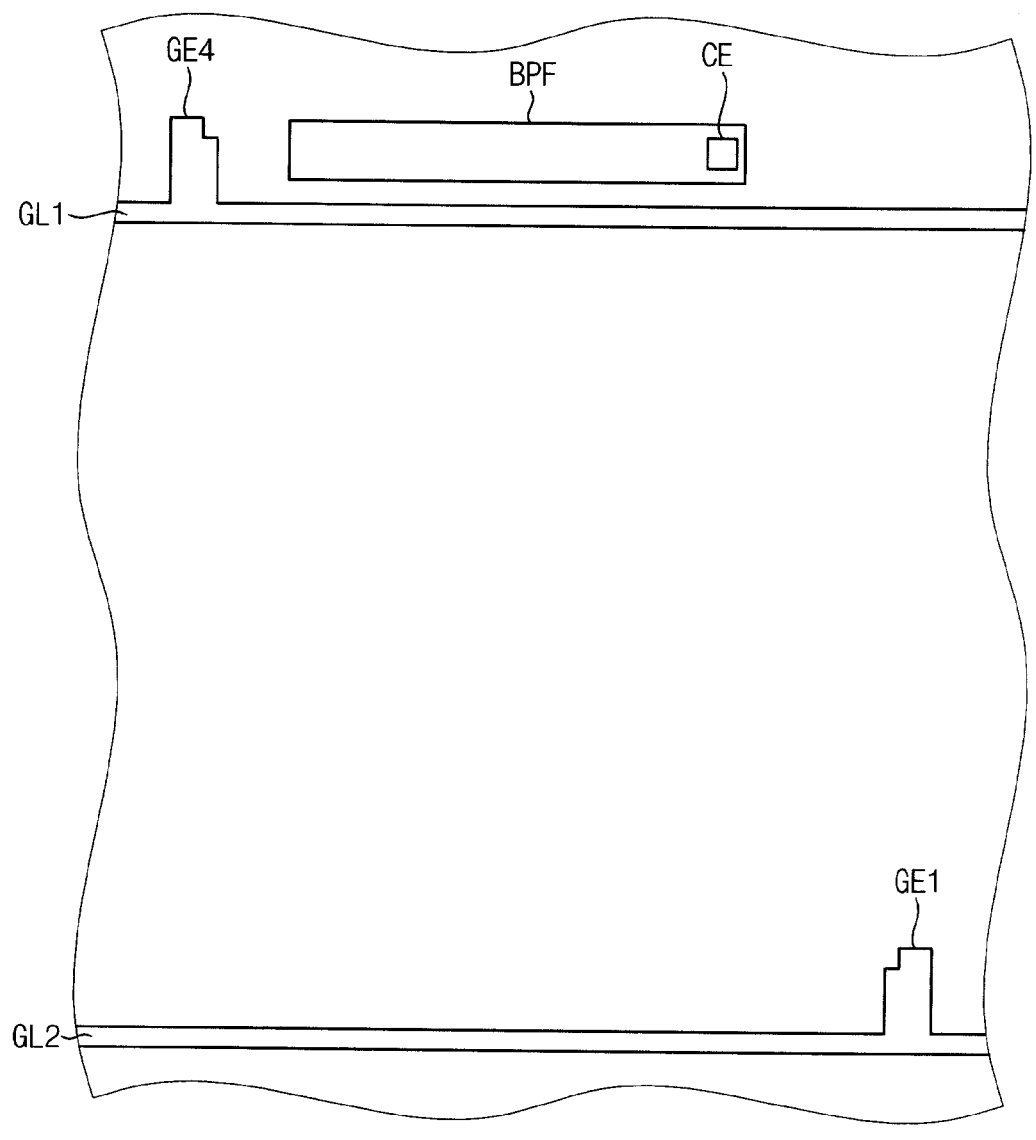
FIGS. 5A to FIG. 5D are plan views for explaining a method of manufacturing the touch sensing substrate according to an exemplary embodiment of the present invention.

Referring to FIGS. 4A and 5A, a band pass filter layer is formed on the base substrate 101. The band pass filter layer is pattered using a photo resist pattern to form a band pass filter BPF. The band pass filter BPF may include amorphous silicon germanium (a-SiGe) and have a thickness of about 2000 Å. The band pass filter BPF blocks a first light and transmits a second light. For example, the first light may be the visible light and the second light may be the infrared light.

A first conductive layer is formed on the base substrate 101 on which the band pass filter BPF is formed. The first conductive layer is patterned using a photo resist pattern to from a first conductive pattern including the first and second gate lines GL1 and GL2, the first gate electrode GE1 and the connection electrode CE. The first conductive layer includes metal such as chromium (Cr), aluminum (Al), tantalum (Ta), molybdenum (Mo), titanium (Ti), tungsten (W), copper (Cu), silver (Ag), etc or alloy thereof. The first conductive layer may include two or more layers having different physical characteristics. For example, the first conductive layer may have a multi-layer structure including aluminum (Al) and molybdenum (Mo).

According to the present example embodiment, the band pass filter BPF and the first conductive pattern are formed using two separate masks. Alternatively, the band pass filter BPF and the first conductive pattern may be formed using a slit mask or a half tone mask. In this case, the band pass filter layer may be disposed under the first conductive pattern.

A first insulating layer 120 is formed on the base substrate 101 on which the first conductive pattern is formed. The first insulating layer 120 may be formed with silicon nitride (SiNx), silicon oxide (SiOx), and the like.

Figure 4B:
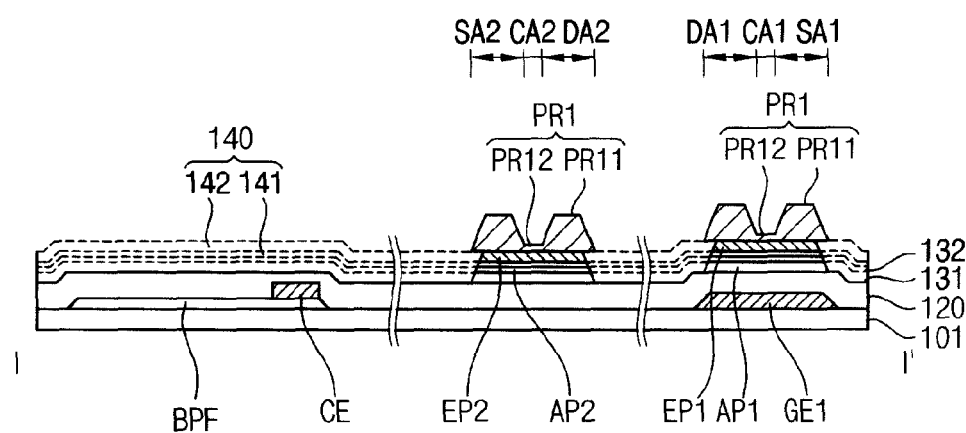
Figure 5B:
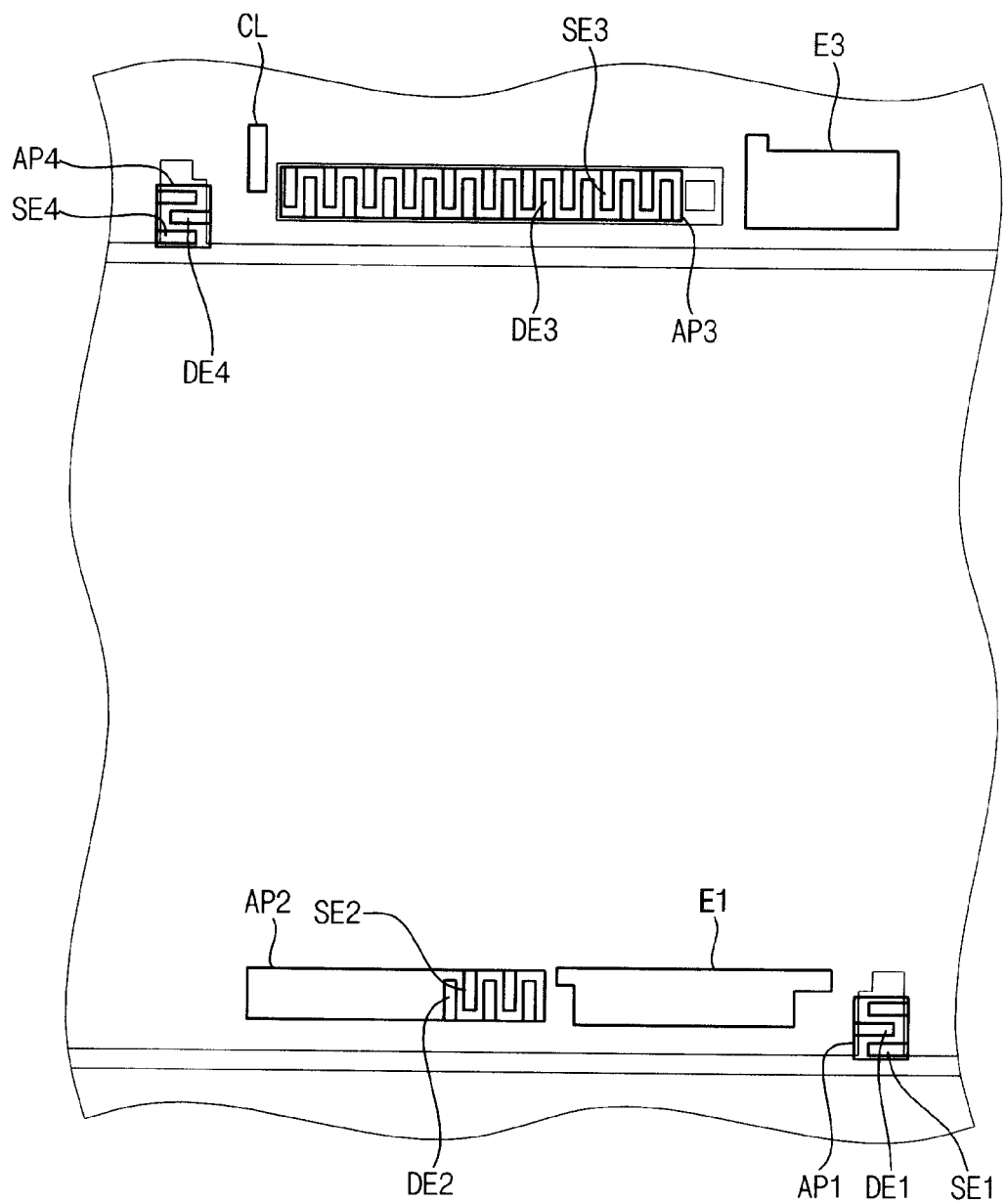

Referring to FIGS. 4A, 4B and 5B, a first semiconductor layer 131, a first ohmic contact layer 132 and a second conductive layer 140 are formed on the base substrate 101 on which the first insulating layer 120 is formed. For example, after the first ohmic contact layer 132 is formed, the second conductive layer 140 may be directly formed on the base substrate 101 on which the first ohmic contact layer 130 is formed without an additional process between forming the first ohmic contact layer 132 and forming the second conductive layer 140. A damage to the first ohmic contact layer 132 may be minimized so that an ohmic contact may be improved.

The first semiconductor layer 131 may include amorphous silicon (a-Si). The first ohmic contact layer 132 may include n+ amorphous silicon (n+ a-Si). The second conductive layer 140 may include a first metal layer 141 and a second metal layer 142 formed on the first metal layer 141. An etching selectivity of the first metal layer 141 is different from an etching selectivity of the second metal layer 142. For example, the first metal layer 141 may be titanium (Ti) and the second metal layer 142 may be copper (Cu).

A first photo resist pattern PR1 is formed using the photo resist material on the base substrate on which the second metal layer 142 is formed. The first photo resist pattern PR1 is patterned using the slit mask or the half tone mask, and includes a first photo pattern PR11 of a first thickness and a second photo pattern PR12 of a second thickness thinner than the first thickness.

The first photo pattern PR11 is disposed on a first source area SA1 in which the first source electrode SE1 is formed, a first drain area DA1 in which the first drain electrode DE1 is formed, a second source area SA2 in which the second source electrode SE2 is formed, and a second drain area DA2 in which the second drain electrode DE2 is formed. In addition, the first photo pattern PR11 may be disposed in an area in which the connection line CL is formed. The second photo pattern PR12 is disposed in a first channel area CA1 formed between the first source electrode SE1 and first drain electrode DE1, and in a second channel area CA2 formed between the second source electrode SE2 and the second drain electrode DE2.

The first metal layer 141 and the second metal layer 142 are patterned using the first photo resist pattern PR1 via a wet etching process. Then, the first semiconductor layer 131 and the first ohmic contact layer 132 are patterned using the first photo resist pattern PR1 via a dry etching process.

The first active pattern AP1, a first electrode pattern EP1 formed on the first active pattern AP1, the second active pattern AP2, and a second electrode pattern EP2 formed on the second active pattern AP2 are formed using the first photo resist pattern PR1. In addition, using the first photo resist pattern PR1, the connection line CL may be formed. An active pattern including the first semiconductor layer 131 and the first ohmic contact layer 132 may be disposed under the connection line CL.

The first active pattern AP1 and the first electrode pattern EP1 are patterned using the first photo resist pattern PR1 so that step coverage of the first electrode pattern EP1 may be improved irrespective of a damage of a side profile of the first active pattern AP1 due to the etching process. In addition, the second active pattern AP2 and the second electrode pattern EP2 are patterned using the first photo resist pattern PR1 so that the step coverage of the second electrode pattern EP2 may be improved irrespective of the damage of the side profile of the second active pattern AP2 due to the etching process.

The first source electrode SE1, the second source electrode SE2, the first drain electrode DE1 and the second drain electrode DE2 are formed from the first and second electrode patterns EP1 and EP2. Therefore, the step coverage of the first source electrode SE1, the second source electrode SE2, the first drain electrode DE1 and the second drain electrode DE2 may be improved.

Figure 4C:
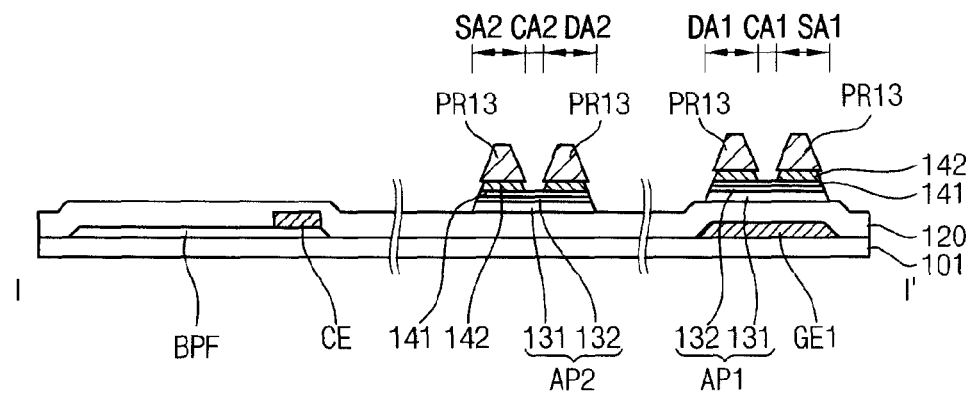

Referring to FIGS. 4A, 4C and 5B, the first photo resist pattern PR1 is partially etched in an etch back process so that the second photo pattern PR12 is removed and the first photo pattern PR11 is etched to form a third photo pattern PR13 of a third thickness.

The third photo pattern PR13 is disposed on the first source area SA1, the first drain area DA1, the second source area SA2 and the second drain area DA2. Using third photo pattern PR13, the second metal layer 142 of the first electrode pattern EP1 is etched. In addition, using the third photo pattern PR13, the second metal layer 142 of the second electrode pattern EP2 is etched.

The first metal layer 141 of each of the first and second electrode patterns EP1 and EP2 is used as an active protection layer or an etch stopper in a following process. The active protection layer or the etch stopper prevents the first and second active patterns AP1 and AP2 from being etched. Accordingly, additional processes forming the active protection layer and removing the active protection layer may be omitted so that a manufacturing process may be simplified, a damage of the active pattern may be decreased, and the side profile of the active pattern may be improved.

Then, the third photo pattern PR13 is removed.

Figure 4D:
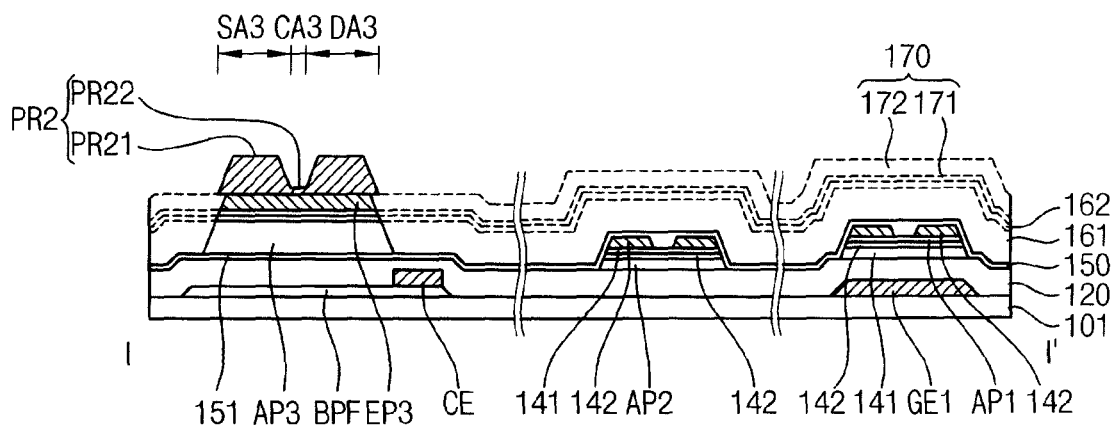

Referring to FIGS. 4C, 4D and 5B, a second insulating layer 150, a second semiconductor layer 161, a second ohmic contact layer 162 and a third conductive layer 170 are formed on the base substrate 101 on which the third photo pattern PR13 is removed. For example, after the second ohmic contact layer 162 is formed, the third conductive layer 170 may be directly formed on the base substrate 101 on which the second ohmic contact layer 162 is formed without an additional process between forming the second ohmic contact layer 162 and forming the third conductive layer 170. A damage to the second ohmic contact layer 162 may be decreased so that an ohmic contact may be improved.

The second insulating layer 150 may include silicon nitride (SiNx) and have a thickness of about 500 Å. The second insulating layer 150 improves an interfacial tension between the second insulating layer 150 and the second semiconductor layer 161 so that the second insulating layer 150 may prevent the second semiconductor layer 161 from being lifted.

The second semiconductor layer 161 may include amorphous silicon germanium (a-SiGe) and have a thickness of about 4000 Å. The second ohmic contact layer 162 may include n+ amorphous silicon (n+ a-Si) and have a thickness of about 500 Å. The third conductive layer 170 includes a third metal layer 171 and a fourth metal layer 172 formed on the third metal layer 171. The etching selectivity of the third metal layer 171 may be different from the etching selectivity of the fourth metal layer 172. For example, the third metal layer 171 may include titanium (Ti), and the second metal layer 142 may include copper (Cu).

A second photo resist pattern PR2 is formed using the photo resist material on the base substrate 101 on which the fourth metal layer 172 is formed. The second photo resist pattern PR2 is patterned using the slit mask or the half tone mask, and includes a first photo pattern PR21 of a first thickness and a second photo pattern PR22 of a second thickness being thinner than the first thickness.

The first photo pattern PR21 is disposed on a third source area SA3 in which the third source electrode SE3 is formed, and a third drain area DA3 in which the third drain electrode DE3 is formed. The second photo pattern PR22 is disposed in a third channel area CA3 formed between the third source electrode SE3 and the third drain electrode DE3.

The third metal layer 171 and the fourth metal layer 172 are patterned using the second photo resist pattern PR1 via a wet etching process. Then, the second semiconductor layer 161, the second ohmic contact layer 162 and the second insulating layer 150 are patterned using the second photo resist pattern PR1 via a dry etching process. The first metal layer 141 of each of the first and second electrode patterns EP1 and EP2 is used to protect the first and second active patterns AP1 and AP2 as the active protection layer or the etch stopper. Accordingly, additional processes forming the active protection layer and removing the active protection layer may be omitted.

The third active pattern AP3, the third electrode pattern EP3 formed on the third active pattern AP3, and an insulating pattern 151 formed between the first insulating layer 120 and the third active pattern AP3 are formed using the second photo resist pattern PR2.

The third active pattern AP3 and the third electrode pattern EP3 are patterned using the second photo resist pattern PR2 so that the step coverage of the third electrode pattern EP3 may be improved irrespective of a damage of a side profile of the third active pattern AP3 due to the etching process. The third source electrode SE3 and the third drain electrode DE3 are formed from the third electrode patterns EP3. Therefore, the step coverage of the third source electrode SE3 and the third drain electrode DE3 may be improved.

Figure 4E:
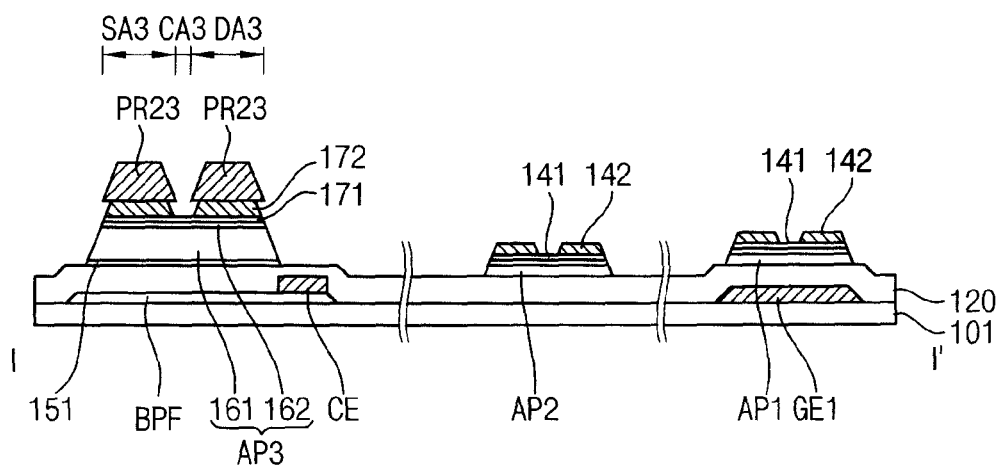

Referring to FIGS. 4D, 4E and 5B, the second photo resist pattern PR2 is partially etched in a etch back process so that the second photo pattern PR22 is removed and the first photo pattern PR21 is etched to from a third photo pattern PR23 of a third thickness.

The third photo pattern PR23 is disposed in the third source area SA3 and the third drain area DA3. Using the third photo pattern PR23, the fourth metal layer 172 of the third electrode pattern EP3 is etched. Then, the third photo pattern PR23 is removed.

Figure 4F:
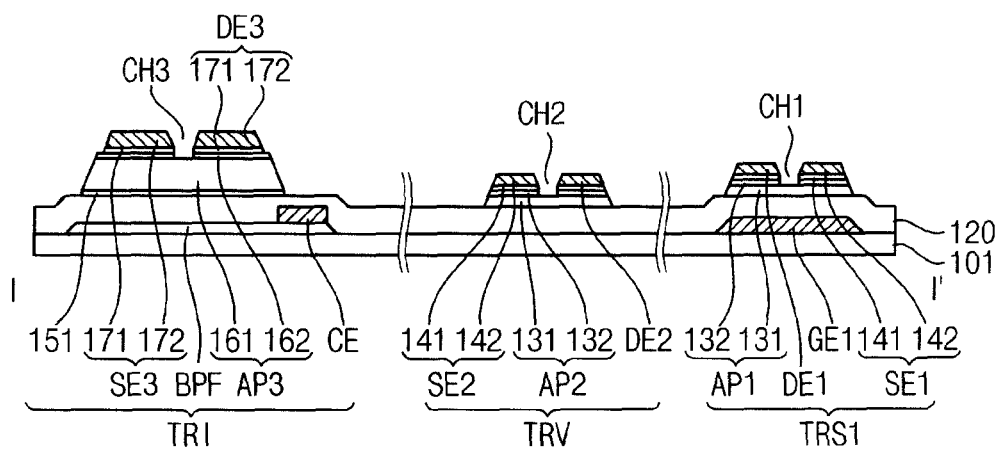

Referring to FIGS. 4E, 4F, and 5B, using the second metal layer 142 of the first electrode pattern EP1, the second metal layer 142 of the second electrode pattern EP2, and the fourth metal layer 172 of the third electrode pattern EP3 as a mask, the first metal layer 141 of the first electrode pattern EP1, the first metal layer 141 of the second electrode pattern EP2 and the third metal layer 171 of the third electrode pattern EP3 are patterned.

Accordingly, the first electrode pattern EP1 is formed into the first source electrode SE1 and the first drain electrode DE1, the second electrode pattern EP2 is formed into the second source electrode SE2 and the second drain electrode DE2, the third electrode pattern EP3 is formed into the third source electrode SE3 and the third drain electrode DE3. Therefore, a second conductive pattern is formed on the base substrate 101. The second conductive pattern includes the first to fourth source electrodes SE1, SE2, SE3 and SE4, the first to fourth drain electrodes DE1, DE2, DE3 and DE4 and the connection line CL.

Then, using the first, second, third source electrodes SE1, SE2 and SE3, the first, second and third drain electrodes DE1, DE2 and DE3 as a mask, the first ohmic contact layer 132 of the first active pattern AP1, the first ohmic contact layer 132 of the second active pattern AP2, and the second ohmic contact layer 162 of the third active pattern AP3 is removed. Thus, a first channel CH1 is formed in each of the first and second switching elements TRS1 and TRS2, a second channel CH2 is formed in each of the first light sensing element TRV, and a third channel CH3 is formed in each of the second light sensing element TRI.

Figure 4G:
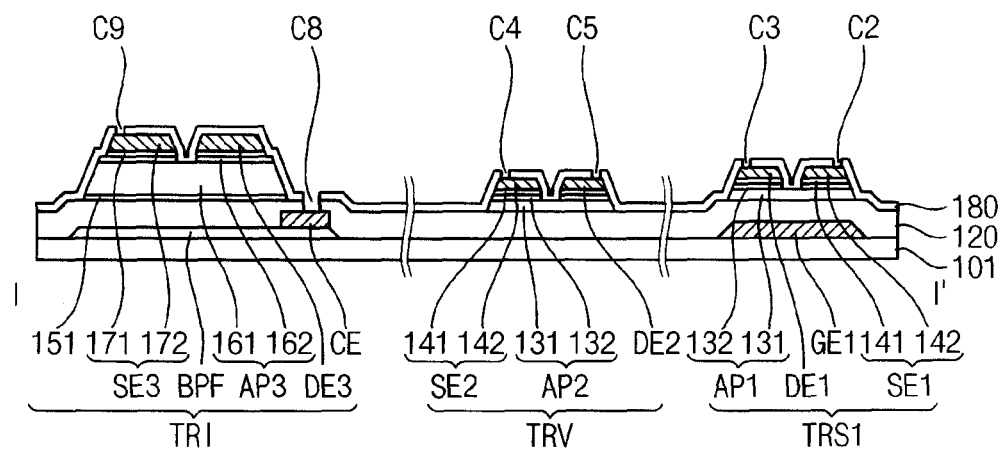
Figure 5C:
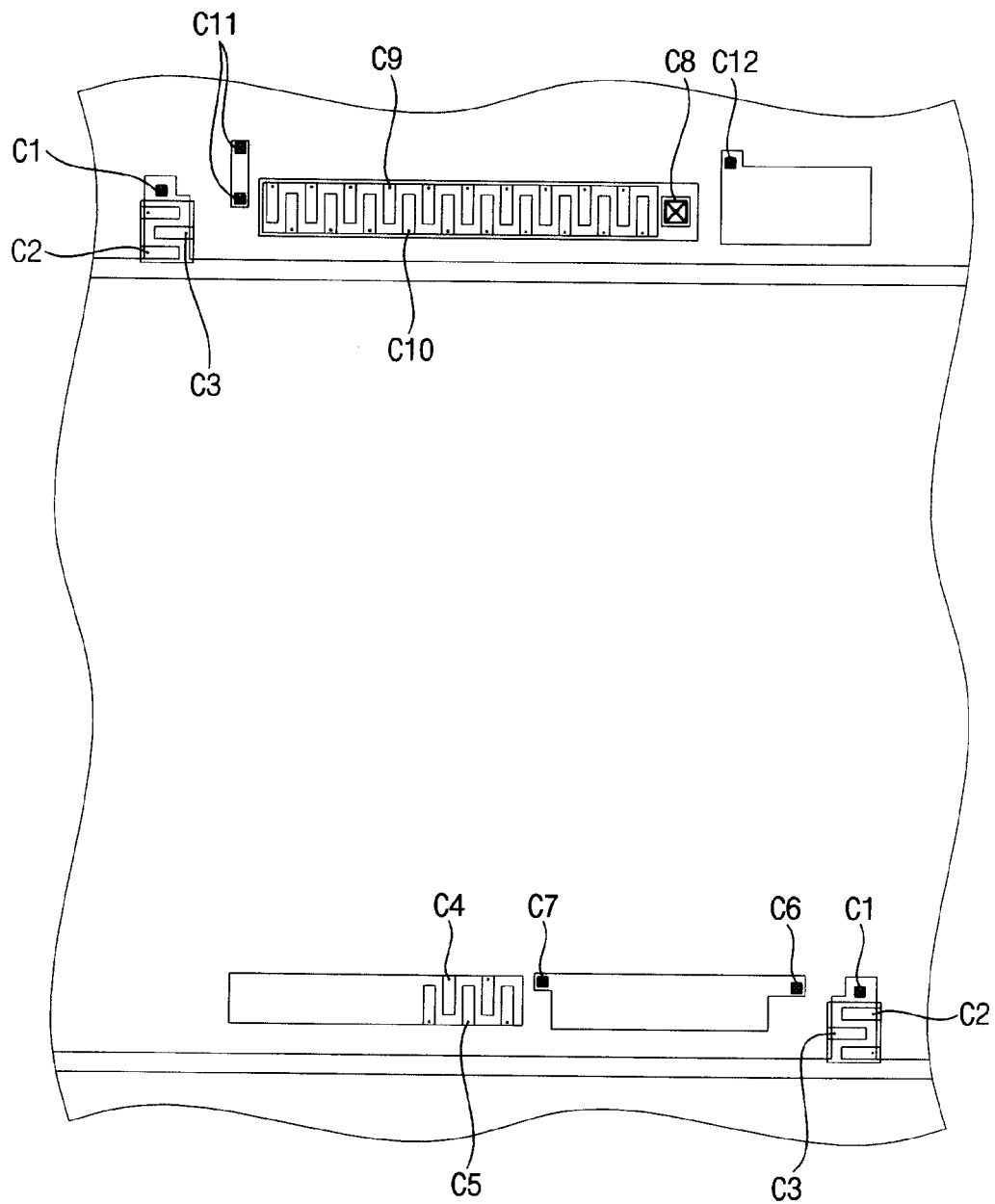

Referring to FIGS. 4F, 4G and 5C, the third insulating layer 180 is formed on the base substrate 101 on which the first, second and third channels CH1, CH2 and CH3 are formed. The third insulating layer 180 may include silicon nitride (SiNx) and silicon oxide (SiOx).

Using a mask or a photo resist pattern, the third insulating layer 180 and the first insulating layer 120 is etched to form first, second, third, third, fourth, sixth, seventh, eighth, ninth, tenth, eleventh and twelfth contact holes which are C1, C2, C3, C4, C5, C6, C7, C8, C9, C10, C11 and C12, respectively, thus exposing the first conductive pattern and the second conductive pattern.

Figure 4H:
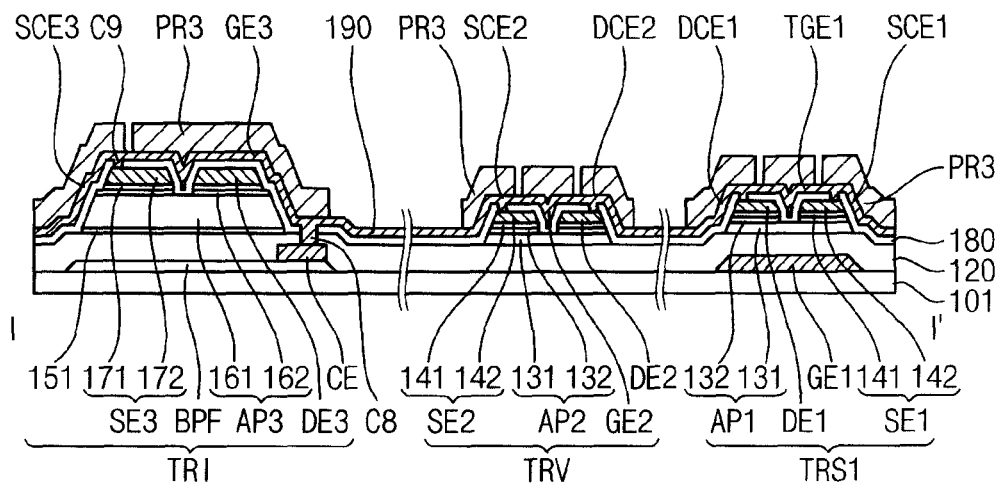
Figure 5D:
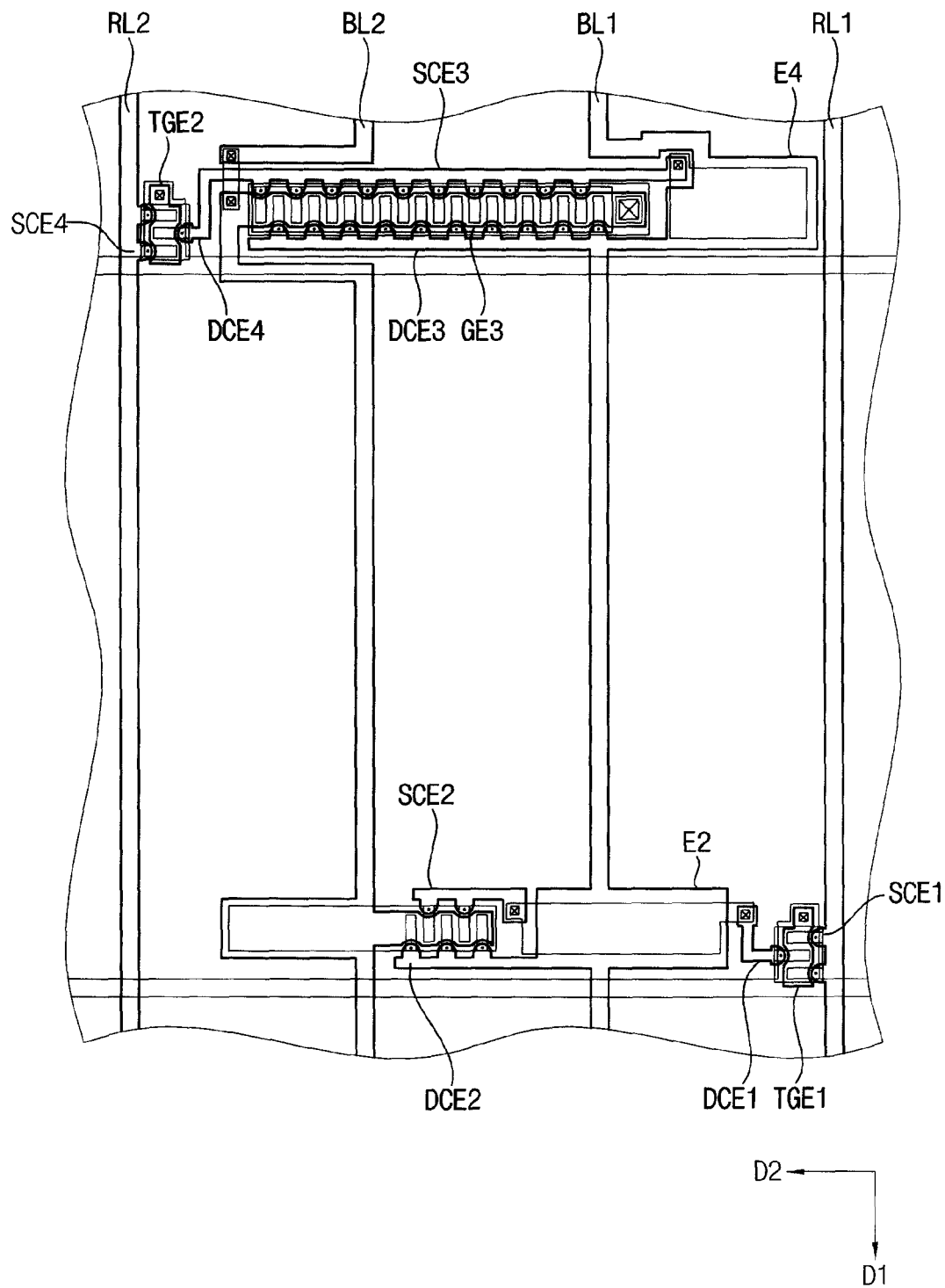

Referring to FIGS. 4G, 4H and 5D, a fourth conductive layer 190 is formed on the base substrate 101 on which the first, second, third, third, fourth, sixth, seventh, eighth, ninth, tenth, eleventh and twelfth contact holes which are C1, C2, C3, C4, C5, C6, C7, C8, C9, C10, C11 and C12, respectively, are formed. The fourth conductive layer 190 may include metal such as chromium (Cr), aluminum (Al), tantalum (Ta), molybdenum (Mo), titanium (Ti), tungsten (W), copper (Cu), silver (Ag), etc or alloy thereof. In addition, the fourth conductive layer 190 may include two or more layers having different physical characteristics. For example, the fourth conductive layer 190 may have a multi-layer structure including aluminum (Al) and molybdenum (Mo). In addition, the fourth conductive layer 190 may include a transparent conductive material.

A third photo resist pattern PR3 is formed using the photo resist material on base substrate 101 on which the fourth conductive layer 190 is formed. The photo resist pattern PR3 is disposed on an area in which the read out lines RL1 and RL2, the bias lines BL1 and BL2, the top gate electrodes TGE1 and TGE2, the second gate electrode GE2, the third gate electrode GE3, the source connection electrodes SCE1, SCE2 and SCE3, the drain connection electrodes DCE1, DCE2 and DCE3, the second electrode E2 and the fourth electrode E4 are formed.

A capacitance is generated in a crossing area of the gate lines GL1 and GL2 extends in the second direction D2 and the read out lines RL1 and RL2 or the bias lines BL1 and BL2 extends in the first direction D1. A resistance of lines GL1, GL2, RL1, RL2, BL1 and BL2 may be increased by the capacitance of the crossing area. According to the present example embodiment, the gate lines GL1 and GL2 are formed using the first conductive layer, the read out lines RL1 and RL2 and the bias lines BL1 and BL2 are formed using the fourth conductive layer. A distance between the first conductive layer and the fourth conductive layer may be increased so that the capacitance of the crossing area may be decreased. Thus, the resistance of lines GL1, GL2, RL1, RL2, BL1 and BL2 may be decreased by the capacitance of the crossing area.

Figure 4I:
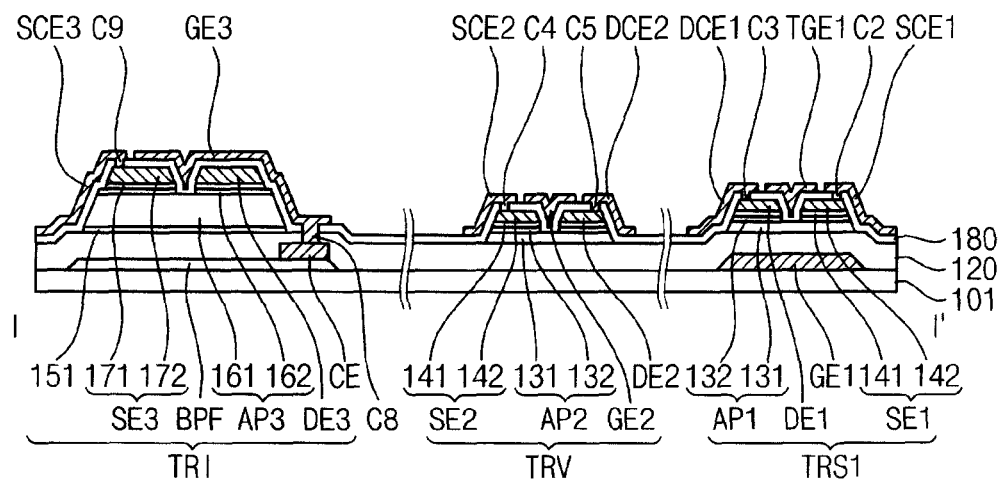

Referring to FIGS. 4H, 4I and 5D, using the third photo resist pattern PR3, the fourth conductive layer 190 is patterned to form a fourth conductive pattern. The fourth conductive pattern may include the read out lines RL1 and RL2, the bias lines BL1 and BL2, the top gate electrodes TGE1 and TGE2, the second gate electrode GE2, the third gate electrode GE3, the source connection electrodes SCE1, SCE2 and SCE3, the drain connection electrodes DCE1, DCE2 and DCE3, the second electrode E2 and the fourth electrode E4.

Referring to FIGS. 2, 4I and 5D, an organic insulating layer OL is formed on the base substrate 101 on which the fourth conductive pattern is formed. The organic insulating layer OL may be an over coating layer. In addition, the organic insulating layer OL may include the blocking pattern BM and the color filter CF. For example, the blocking pattern BM may be disposed on a block area of the base substrate 101 in which the first switching element TRS1, the second switching element TRS2, the first light sensing element TRV, the second light sensing element TRI, the first sensing capacitor SC1 and the second sensing capacitor SC2. The color filter CF may be disposed on the pixel area of the base substrate 101.

According to the present example embodiment, the active pattern, the source electrode and a drain electrode is patterned using the slit mask or half tone mask so that the step coverage of the source and drain electrodes may be improved irrespective of a damage of a side profile of the third active pattern. Thus, the source and drain electrodes are prevented from being short circuited. In addition, the source and drain electrodes are formed using two metal layers having the etching selectivity different from each other, so that additional processes forming the active protection layer and removing the active protection layer may be omitted and the manufacturing process may be simplified.

Figure 6:
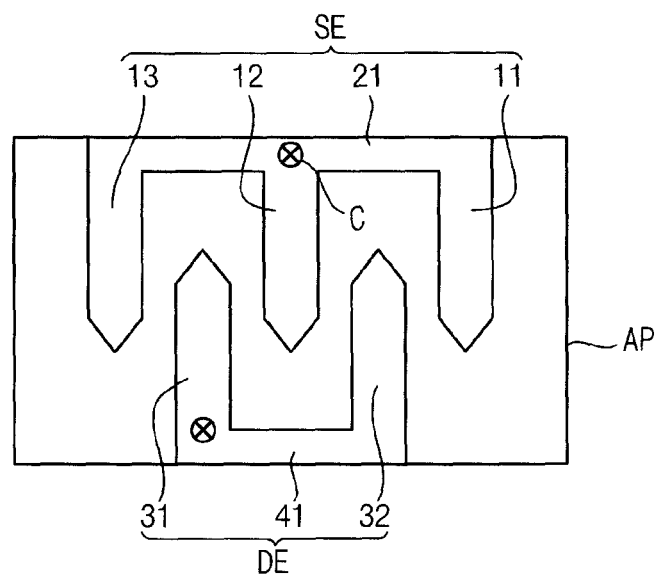
FIG. 6 is a plan view illustrating source and drain electrodes according to an exemplary embodiment of the present invention.

FIG. 6 is a plan view illustrating source and drain electrodes according to an exemplary embodiment of the present invention.

Referring to FIG. 6, the source electrode SE and the drain electrode DE are disposed on the active pattern AP. The active pattern AP, the source electrode SE and the drain electrode DE are patterned using the slit mask and the half tone mask, so that the source electrode SE and the drain electrode DE are disposed on the active pattern AP, and sides of the active pattern are aligned with sides of the source electrode SE and the drain electrode DE.

The source electrode SE includes a plurality of first finger portions 11, 12 and 13 and a first connection part 21 connecting the first finger portions 11, 12 and 13 disposed adjacent to each other. The drain electrode DE includes a plurality of second finger portions 31 and 32 and a second connection part 41 connecting the second finger portions 31 and 32 disposed adjacent to each other.

The first finger portions 11, 12 and 13 are connected to each other by the first connection part 21 so that the number of contact holes C formed through the first finger portions 11, 12 and 13 may be decreased. In addition, the second finger portions 31 and 32 are connected to each other by the second connection part 41 so that the number of the contact holes C formed through the second finger portions 31 and 32 may be decreased. As the described in FIG. 1, the contact hole C is formed for respectively connecting the source connection electrode SCE and the drain connection electrode DCE with the source electrode SE and the drain electrode DE.

According to the present example embodiment, in comparison with the pervious example embodiment, the number of the contact holes C may be decreased so that process reliability may be increased.

Figure 7:
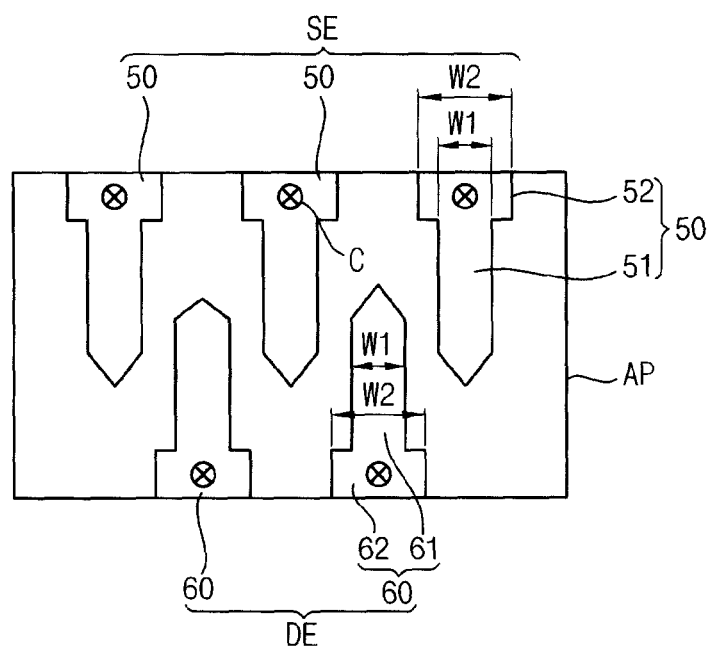
FIG. 7 is a plan view illustrating source and drain electrodes according to an exemplary embodiment of the present invention.

FIG. 7 is a plan view illustrating source and drain electrodes according to an exemplary embodiment of the present invention.

Referring to FIG. 7, the source electrode SE includes a plurality of first finger portions 50, and each of the first finger portions 50 includes a first electrode part 51 and a first extending part 52. The drain electrode DE includes a plurality of second finger portions 60 and each of the second finger portions 60 includes a second electrode part 61 and a second extending part 62.

The first electrode part 51 has a first width W1, and the first extending part 52 has a second width W2 larger than the first width W1. The second electrode part 61 has a first width W1, and the second extending part 62 has a second width W2. The second width W2 of each of the first and second extending parts 52 and 62 is larger than the first width W1 of each of the first and second electrode parts 51 and 61, so that an area in which the contact hole C is formed may be increased. As the described in FIG. 1, the contact hole C is formed for respectively connecting the source connection electrode SCE and the drain connection electrode DCE with the source electrode SE and the drain electrode DE.

According to the present example embodiment, in comparison with the pervious example embodiment, the area in which the contact hole C is formed may be increased so that process reliability may be increased.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A touch sensing substrate comprising:
   a substrate;
   a first light sensing element on the substrate and configured to sense a first light,
   the first light sensing element comprises a first gate electrode, a first active pattern overlapping with the first gate electrode, a first source electrode partially overlapping with the first active pattern, and a first drain electrode partially overlapping with the first active pattern, the first gate electrode, the first active pattern, the first source electrode and the first drain electrode being disposed on the substrate;
   a second light sensing element on the substrate and configured to sense a second light,
   the second light sensing element comprises a second gate electrode, a second active pattern overlapping with the second gate electrode and comprising a material different from the first active pattern, a second source electrode partially overlapping with the second active pattern, and a second drain electrode partially overlapping with the second active pattern, the second gate electrode, the second active pattern, the second source electrode and the second drain electrode being disposed on the substrate;
   a first bias line connected to the first gate electrode and the second gate electrode;
   a first drain connection electrode connected to the first drain electrode through a first contact hole;
   a second drain connection electrode connected to the second drain electrode through a second contact hole;
   a second bias line connected to the first and second drain connection electrodes;
   a first source connection electrode connected to the first source electrode through a third contact hole;
   a second source connection electrode connected to the second source electrode through a fourth contact hole;
   a first switching element connected to the first source connection electrode; and
   a second switching element connected to the second source connection electrode.

2. The touch sensing substrate of claim 1, wherein each of the first source electrode, the first drain electrode, the second source electrode and the second drain electrode comprises a first metal layer and a second metal layer, the first metal layer and the second metal layer having different etching selectivity from each other.

3. The touch sensing substrate of claim 1, wherein the second light sensing element further comprises a band pass filter disposed between the second active pattern and the substrate, electrically connected to the second gate electrode, the band pass filter configured to block the first light and to transmit the second light.

4. The touch sensing substrate of claim 1, wherein each of the first and second source electrodes each comprise a plurality of first finger portions, the first and second drain electrodes each comprise a plurality of second finger portions respectively disposed between the first finger portions, the first and second contact holes are formed on the second finger portions, and the third and fourth contact holes are formed on the first finger portions.

5. The touch sensing substrate of claim 1, wherein the first and second switching elements each comprise a bottom gate electrode connected to a gate line, an active pattern overlapping with the bottom gate electrode, a source electrode partially overlapping with the active pattern, and a drain electrode partially overlap the active pattern.

6. The touch sensing substrate of claim 5, wherein the source and drain electrodes of each of the first and second switching elements comprises a first metal layer and a second metal layer, the first metal layer and the second metal layer having different etching selectivity from each other.

7. The touch sensing substrate of claim 5, wherein the first and second switching elements each comprise a top gate electrode overlapping with the active pattern and connected to the bottom gate electrode.

8. The touch sensing substrate of claim 5, further comprising:
   a third source connection electrode connected to the source electrode of the first switching element through a fifth contact hole;
   a third drain connection electrode connected to the drain electrode of the first switching element through a sixth contact hole, and connected to the first source connection electrode of the first light sensing element;
   a fourth source connection electrode connected to the source electrode of the second switching element through a seventh contact hole; and
   a fourth drain connection electrode connected to the drain electrode of the second switching element through a eighth contact hole, and connected to the second source connection electrode of the second light sensing element.

9. The touch sensing substrate of claim 8, further comprising:
   a first read out line connected to the third source connection electrode;
   a first gate line that crosses the first read out line, and connected to the bottom gate electrode of the first switching element;
   a second read out line connected to the fourth source connection electrode; and
   a second gate line that crosses the second read out line, and connected to the bottom gate electrode of the second switching element.

* * * * *